United States Patent [19]

Lubart et al.

[11] Patent Number: 5,528,750
[45] Date of Patent: Jun. 18, 1996

[54] METHOD/APPARATUS FOR RECOVERING FROM A PROCESS WITHIN THE SYSTEM KERNEL WITHOUT CREATING A RECOVERY ENVIRONMENT

[75] Inventors: Barry P. Lubart, Hurley; Thomas V. Weaver, Woodstock, both of N.Y.

[73] Assignee: International Business Machines Corporation, Armonk, N.Y.

[21] Appl. No.: 417,721

[22] Filed: Apr. 6, 1995

Related U.S. Application Data

[63] Continuation of Ser. No. 228,946, Apr. 18, 1994, abandoned, which is a continuation of Ser. No. 757,873, Sep. 11, 1991, abandoned.

[51] Int. Cl.⁶ ........................................ G06F 11/00
[52] U.S. Cl. .................. 395/182.13; 395/183.13; 395/182.18
[58] Field of Search .................. 395/575, 182.03, 395/182.08, 182.13, 183.14, 183.13, 182.18

[56] References Cited

U.S. PATENT DOCUMENTS

| 4,566,063 | 1/1986 | Zolnowsky et al. | 364/200 |
|---|---|---|---|
| 4,697,266 | 9/1987 | Finley | 371/12 |
| 4,703,481 | 10/1987 | Fremont | 371/12 |
| 4,819,234 | 4/1989 | Huber | 371/19 |
| 4,819,243 | 4/1989 | Huber | 371/19 |
| 4,907,150 | 3/1990 | Arroyo et al. | 364/200 |
| 4,912,707 | 3/1990 | Kogge et al. | 371/12 |
| 5,003,458 | 3/1991 | Yamaguchi et al. | 364/200 |
| 5,220,668 | 1/1993 | Bullis | 395/650 |
| 5,222,217 | 1/1993 | Blount et al. | 395/325 |

FOREIGN PATENT DOCUMENTS

| 53-96379 | 8/1978 | Japan | G06F 11/00 |
|---|---|---|---|
| WO9005952 | 5/1990 | WIPO | G06F 9/46 |

OTHER PUBLICATIONS

IBM DPPX/370 System Programming Reference and Assembler Macros pp. 163–175.

*Primary Examiner*—Robert W. Beausoliel, Jr.
*Assistant Examiner*—Norman M. Wright
*Attorney, Agent, or Firm*—William A. Kinnaman, Jr.; Lily Neff

[57] ABSTRACT

A system and method for establishing a passive recovery environment for an operating system kernel. A cross reference between an instruction address range and recovery routine address is established during binding of the kernel. Normal process initiation and termination includes no recovery overhead. In the case of system failure, the failing instruction address is used to access the recovery routine cross reference tables to determine recovery routine address. The error detection process then initiates recovery routine processing.

12 Claims, 3 Drawing Sheets

| BEGINNING ADDRESS | ROUTINE LENGTH | REC ROUTINE ADDRESS |
|---|---|---|
| X X X | X X | X X X |

METHOD/APPARATUS FOR RECOVERING FROM A PROCESS WITHIN THE SYSTEM KERNEL WITHOUT CREATING A RECOVERY ENVIRONMENT

CROSS-REFERENCE TO RELATED APPLICATIONS

This application is a continuation of application Ser. No. 08/228,946, filed Apr. 18, 1994, now abandoned, which is a continuation of application Ser. No. 07/757,873, filed Sept. 11, 1991, now abandoned.

BACKGROUND OF THE INVENTION

1. Field of the Invention

The present invention is directed to operating a digital information processing system and in particular to a system and method for the processing of error conditions arising during the operation of such an information processing system. More particularly, the present invention relates to a system and method for fault recovery through a recovery environment that operates passively with respect to the executing process.

2. Background of the Invention

Modern information processing systems employ operating system software to manage system function. The operating system provides facilities for scheduling tasks in the data processing system, managing the memory, external storage devices, and other resources of the computer system. Operating systems have evolved into complex software structures which are executed as hundreds of processes on the computer system.

The basic operating system functions are typically grouped into a kernel, a name particularly used with UNIX-based operating systems (UNIX is a trademark of UNIX System Laboratories, Inc.). The kernel is created as a single large operating program with numerous processes that are executed as required.

The operation of any computer system will occasionally encounter system failures due to software errors, hardware errors of equipment failures. When a system failure is encountered, the operation system program must have an ability to analyze the cause of the failure and, if possible, correct the problem and continue processing. Error recovery is particularly important in large multiuser systems where it is impractical to stop and restart the entire system to recover from failure.

Historically, a unique recovery routine is specified and constructed by each operating system process. At the request of the executing process, the kernel establishes a recovery environment based on that routine. In operation, a prior art kernel proceeds through the states as shown in FIG. 1. The operating system first selects the process to be initialized 102, establishes a recovery environment 104, and begins executing the process 106. If the execution is successful, the system terminates the recovery environment 108 and initializes the next process 102. The detection of a failure during the execution of process 106 causes invocation of failure processing routine 110 which enters the appropriate recovery environment 112 and attempts to correct the failure. If the recovery is successful and would allow continued execution of the process, control is returned to process execution 106. Otherwise, resources are freed, e.g., by releasing resource locks, computations are restored to a prior safe state, and the routine terminated. The termination process then terminates the recovery environment 108 and returns to the scheduling of processes 102.

The prior art suffered from the technical problem of creating high system overhead due to the need to establish a recovery environment and terminate that environment for the execution of each process. Because failures occur infrequently, the establishment of a recovery environment on every process creates a large and non-productive overhead. In some operating systems this overhead can consume as much as 20 percent of the computer system capacity.

It would, therefore, be desirable to provide a recovery mechanism that was established and invoked only as required by failure by the computer system. This would result in a large reduction in operating system overhead without the loss of recovery function. The technical problem to be solved is to provide for processing failure recovery without incurring the high processor overhead currently consumed.

SUMMARY OF THE INVENTION

It is therefore an object of the present invention to provide a passive recovery system that minimizes operating system overhead. The term "passive" refers to a situation where establishing a recovery environment requires no run time system overhead. This recovery environment will "passively" exist until a failure is detected, in which case it will be activated for processing.

The present invention provides a passive recovery environment by creating the recovery environment when the operating system routines are bound together to form the kernel and at operating system initialization time. This static recovery environment exists in the operating system and provides a cross reference from the instruction address of any system failure to the appropriate recovery routine. The software or hardware error detection mechanism accesses the static cross reference to determine which recovery routine to initiate. Control is then passed to the appropriate recovery routine which has access to all registers and variables in the current context of the operating system. The present system allows a nested recovery function such that each of the nested functions has an opportunity to perform any recovery action required. Each recovery routine itself may have a recovery routine.

DETAILED DESCRIPTION OF THE PREFERRED EMBODIMENT

The present invention is directed by providing a passive recovery system for an operating system kernel. The invention is described with respect to an operating system kernel, and in particular, to the AIX Operating System (AIX is a registered trademark of the IBM Corporation). It will be appreciated, however, that the techniques described with reference to the AIX operating system kernel can be applied to other operating systems and to any process operating on a computer system. The benefits of a passive recovery system are most notable in the case of an operating system because of the large number of processes and the frequency of execution. However, the technique is applicable and useful to any computer processes even though they are less frequently executed.

Figure 2:
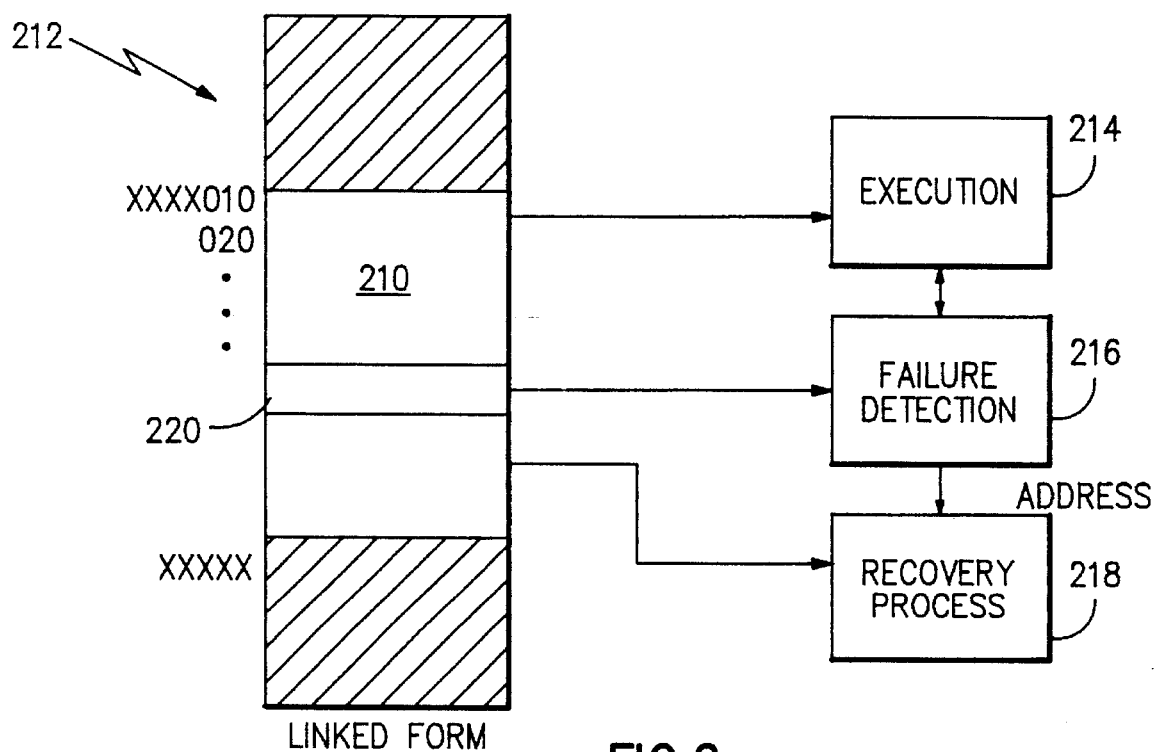
FIG. 2 shows the physical structure of the computer system according to the present invention.

The computer system environment in which the present invention operates is shown schematically in FIG. 2. The operating system kernel 210 is loaded into the computer memory 212 at a certain range of addresses. The process of binding together the various portions of the kernel resolves all address references so that each routine within kernel 210 has a specified address that is known to all other routines. The operating system is executed using the execution element 214. Execution is accomplished by processing instructions from program 210 in the logical order. Logical order can either be sequentially or as directed by branching types of instructions.

Execution will continue as required until a failure is detected. The computer system provides software or hardware failure detection mechanisms 216 which monitor the execution process 214. Upon detection of a failure, the system must execute a recovery process 218. The present invention employs a recovery routine cross reference table 220 that is stored as part of operating system program 210. Failure detection process 216 references table 220 and provides recovery routine address to the recovery processing 218.

Figure 3:
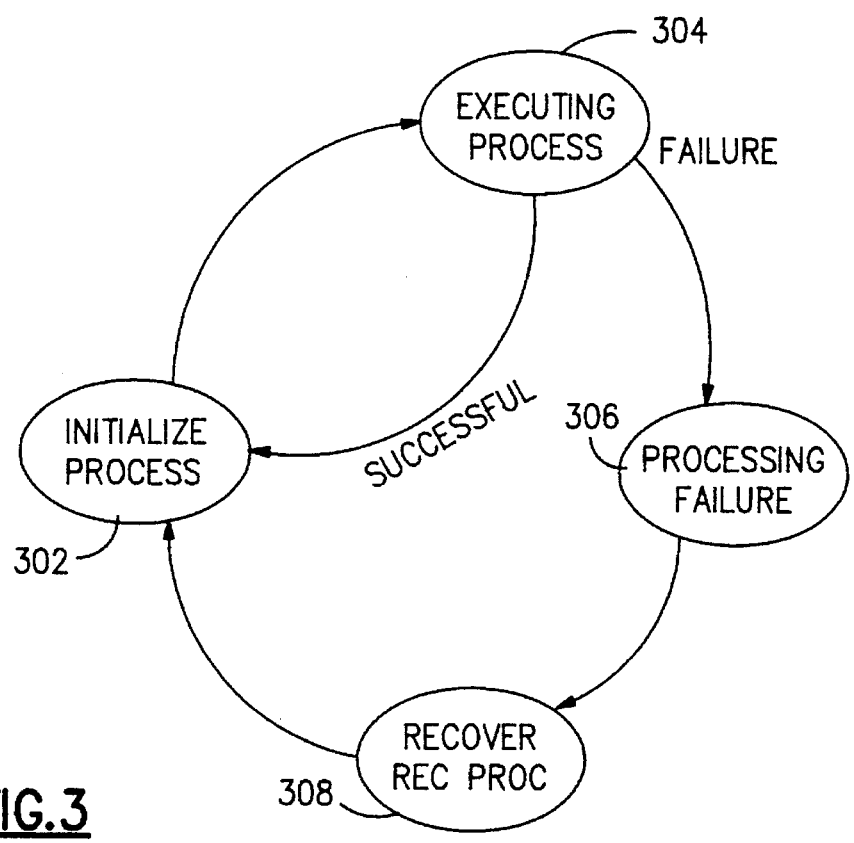
FIG. 3 is a state diagram showing processing states of a computer system according to the present invention.

The sequence of operations described above is shown graphically in the state diagram of FIG. 3. Processing is initialized in state 302; once initialized, execution proceeds at 304 and, if successful, control returns to state 302 for initializing the next process. The occurrence of a failure puts the system in the failure processing state 306 which determines the appropriate processing routine and initiates recovery processing 308. This will typically lead to a branching to the recovery routine which is handled by process initialization 302.

Figure 1:
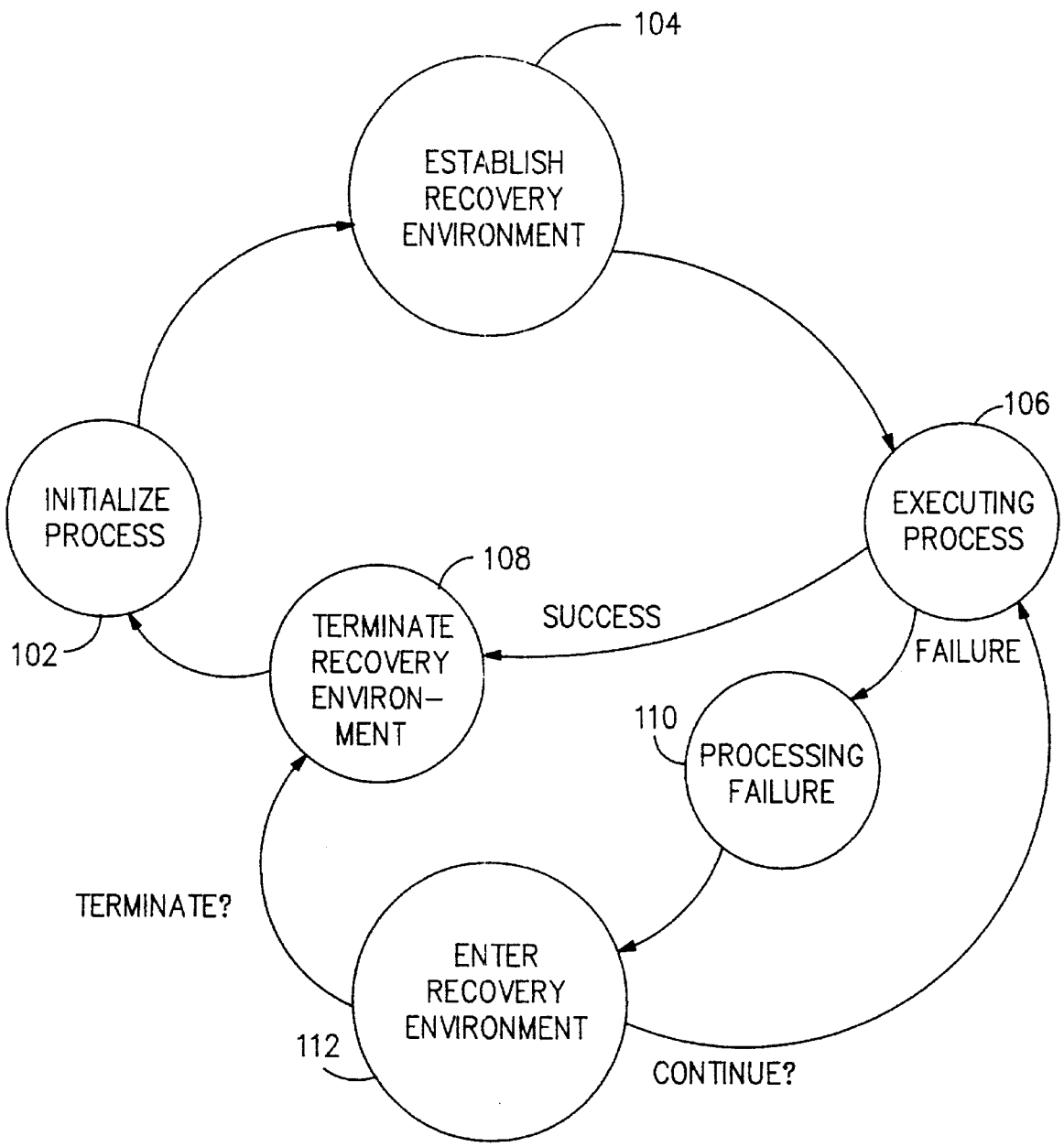
FIG. 1 is a state diagram of a prior art operating system with a recovery environment.

The passive recovery of the present system contains fewer steps than the prior art process which can be seen by comparing FIG. 1 and FIG. 3. The establishment of a recovery environment has been extracted from each process and performed a single time when the kernel is being bound together.

Figures 4, 5:
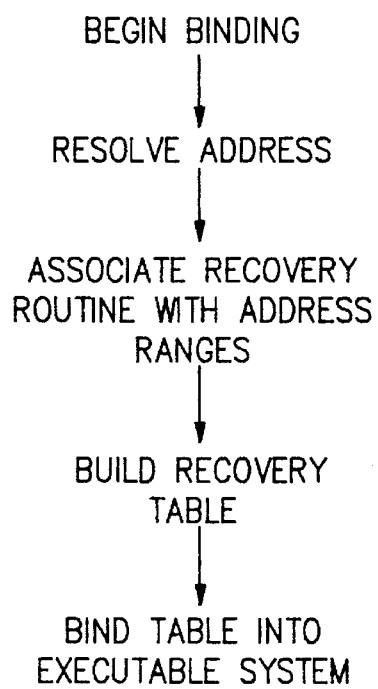
FIG. 4 is a diagram showing an example layout of a recovery routine cross reference table according to the present invention.
FIG. 5 is a flowchart illustrating the establishment of the recovery routine cross reference table during the operating system binding process.

An example of recovery routine cross reference table is shown in FIG. 4. In the preferred embodiment, address ranges of the processing routines are entered into the table with a cross reference to the address of the recovery routine to be executed upon failure at that address. The recovery routine address is an entry point into the operating system which may be executed upon failure. In the preferred embodiment the addresses are shown as a starting offset with a routine length, however, any other form of address range specification can be provided. The address ranges in the table can overlap and need not be mutually exclusive. The failure processing routine will determined all applicable recovery routines and perform them according to the nesting of the main routines.

The recovery routine cross reference table is created during the linking or binding of the operating system kernel. The binding process brings together the process components which will make up the eventual kernel. Among the important tasks of binding is a resolution of addresses within the modules. The binding process attempts to resolve all addresses into a relative address format that is known to all processes. The recovery mechanism according to the present invention requires that the recovery routines for each main processing routine be specified during binding. The binding process associates the recovery routine entry point address with the address ranges of the specified process. Since all addresses are being resolved by the binder, the table that is constructed will have all necessary relative addressing information. The table is constructed and bound into the final operating system kernel so that is can be readily referenced by the failure processing routine.

The process described above results in a static recovery routine cross reference table. This table remains unchanged as the operating system is loaded into a computer and run. In an alternate embodiment of the present invention, the ability to dynamically modify this recovery routine table is provided. The dynamic recovery modification routine requires that the operating system kernel be dynamically modifiable within the computer system. Dynamic modification of the kernel includes resolution of addresses and will allow the modification or change to addresses in both the main processing logic and the recovery routine cross reference. In this manner, recovery routines can be dynamically changed as required.

The present invention requires that the hardware or software failure handling routine be modified to access the recovery routine cross reference table to determine the entry point for recovery process. The failure mechanism determines the recovery routine entry point and beings execution of that routine. The failure routine invokes the recovery routine as part of the same environmental context of the failing component. This allows the recovery routine to have access to the registers and variables needed for the recovery.

The system failure processing is platform dependent but performs similar functions on each platform. The techniques disclosed herein are applicable across many different platforms. Upon the completion of recovery routine processing, an indication is returned to the failure processor that either the error has been recovered and computation can continue from the point of failure, that the error cannot be recovered and the failure system must take some action, or finally that the resources have been recovered but computation cannot proceed. If computation cannot continue, the failure processor must determine the routine invoking the failure function (e.g., by examining the call stack) and invoke the recovery routine for that calling routine. This process will continue until computation may be resumed or is found to be unrecoverable. If an unrecoverable error is detected a platform specific action is taken.

The present invention has the advantage that normal operation requires no additional instructions for recovery processing. This results in a significant reduction of overhead in operating system components. The present invention, however, provides robust failure handling and recovery processing.

The present invention has been described in terms of specific systems and functions. It will be recognized by those skilled in the art that many modifications or changes can be made to this invention without departing from the true spirit of the invention. The above description is provided as a description only and is not intended to be interpreted in a limiting sense. The invention is to be limited only by the appended claims.

We claim:

1. In a computer system having a processor executing one or more processing routines, each of said processing routines comprising a sequence of instructions stored at respective instruction addresses in storage, a method of recovering from an error in executing one of said processing routines, comprising the steps of:

(a) prior to execution of any of said processing routines, associating the address of a recovery routine with each of a plurality of ranges of said instruction addressees, each of said instruction addresses being contained within at least one of said plurality of ranges, said recovery routine having one or more subroutines with recovery action options; and (b) In response to the detection of an error in processing an instruction of one of said processing routines:

(1) determining the one or more instruction address ranges containing the instruction address of said instruction; and (2) for each of said one or more instruction address ranges containing the instruction address or said instruction, executing the recovery routine whose address is associated with said address range.

2. The method of claim 1 wherein said step (a) comprises the step of storing a cross reference table having a plurality of entries corresponding to respective instruction address ranges, each of said plurality of entries indicating the address of at least one recovery routine associated with the corresponding instruction address range.

3. The method of claim 2 wherein said step (b)(1) comprises the step of searching said cross reference table for an address range containing said instruction address.

4. The method of claim 2 wherein each of said entries indicates the beginning address and extent of the corresponding range.

5. The method of claim 1 wherein said step (b)(2) comprises the step of branching to said recovery routine address associated with said instruction address range; and branching to one or more said subroutines contained in said recovery routine when needed to complete recovery procedure.

6. The method of claim 1 further comprising the step of resuming execution of the processing routine if recovery is successful, otherwise terminating execution of said processing routine; and the step of sending a message indicating the status and any additional comments pertaining to availability of resources and termination or successful completion of said execution.

7. The method of claim 1 wherein said step (a) is performed when said processing routines and said recovery routines are bound together to form an executable program.

8. The method of claim 1 wherein at least one of said instruction addresses is contained within a plurality of said instruction address ranges.

9. In a computer system having a processor executing one or more processing routines, each of said processing routines comprising a sequence of instructions stored at respective instruction addresses in storage, apparatus for recovering from an error in executing one of said processing routines, comprising:

means operable prior to execution of any of said processing routines for associating the address of a recovery routine with each of a plurality of ranges of said instruction addresses, each of said instruction addresses being contained within at least one of said plurality of ranges; and said recovery routine having one or more subroutines with recovery action options; and means responsive to the detection of an error in processing an instruction of one of said processing routines for determining the one or more instruction address ranges containing the instruction address of said instruction; and means for determining the one or more recovery routines whose addresses are associated with said one or more instruction address ranges; and means for causing said processor to execute said one or more recovery routines.

10. The apparatus of claim 9 wherein said means for associating the address of a recovery routine with each of a plurality of ranges of said instruction addresses comprises means for storing a cross reference table having a plurality of entries corresponding to respective instruction address ranges, each of said entries indicating the address of at least one recovery routine associated with the corresponding instruction address range.

11. The apparatus of claim 9 wherein said means for associating is operable when said processing routines and said recovery routines are bound together to form an executable program.

12. The apparatus of claim 9 wherein at least one of said instruction addresses is contained within a plurality of said instruction address ranges.

* * * * *

UNITED STATES PATENT AND TRADEMARK OFFICE
CERTIFICATE OF CORRECTION

PATENT NO. : 5,528,750
DATED : Jun. 18, 1996
INVENTOR(S) : Barry P. Lubart et al.

It is certified that error appears in the above-indentified patent and that said Letters Patent is hereby corrected as shown below:

Col. 5, line 10          "addressees" should be --addresses--.

Signed and Sealed this

Eighth Day of October, 1996

Attest:

BRUCE LEHMAN

*Attesting Officer*          *Commissioner of Patents and Trademarks*